(12) United States Patent
Benson et al.

(10) Patent No.: US 6,741,697 B2
(45) Date of Patent: *May 25, 2004

(54) TELEPHONE CALL CENTRE PERFORMANCE EVALUATION

(75) Inventors: Paul Benson, Winchester (GB); Alan Adrian Impey, Salisbury (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,527

(22) Filed: Oct. 20, 1998

(65) Prior Publication Data
US 2002/0067821 A1 Jun. 6, 2002

(30) Foreign Application Priority Data
Mar. 31, 1998 (GB) .............................................. 9806864

(51) Int. Cl.$^7$ ................................................ H04M 3/00

(52) U.S. Cl. .............................. 379/265.02; 379/93.12; 379/265.06; 379/266.1

(58) Field of Search ............................ 379/93.12, 127, 379/93.23, 201, 265, 266, 267, 265.01, 266.01

(56) References Cited

U.S. PATENT DOCUMENTS

| 5,103,449 A | | 4/1992 | Jolissaint ................. 370/110.1 |
| 5,311,577 A | | 5/1994 | Madrid et al. ................. 379/93 |
| 5,402,474 A | | 3/1995 | Miller et al. ................... 379/93 |
| 5,621,789 A | | 4/1997 | McCalmont et al. ....... 379/265 |
| 5,818,907 A | * | 10/1998 | Maloney et al. ......... 379/32.01 |
| 5,999,965 A | * | 12/1999 | Kelly ......................... 709/202 |
| 6,009,415 A | * | 12/1999 | Shurling et al. ............... 705/35 |
| 6,058,163 A | * | 5/2000 | Pattison et al. ............... 379/34 |
| 6,215,865 B1 | * | 4/2001 | McCalmont ........... 379/212.01 |

FOREIGN PATENT DOCUMENTS

GB    2290193    12/1995    ............ H04M/3/50

\* cited by examiner

Primary Examiner—Bing Bui
(74) Attorney, Agent, or Firm—Douglas W. Cameron; Anne V. Dougherty (57) ABSTRACT

A method of monitoring the performance of a CTI enabled business application for a call center is described. The method comprises the steps of acquiring telephony network information such as an Automatic Number Identification from the telephony network when a telephone call is made to the call center and searching for information stored by the business application such as the customer name which is associated with the ANI from the telephony network. This search is made at the beginning of the call and the customer name is stored with ANI in a call log. Additional information associated with the call such as an order taken during the call is searched for after the call is completed and this additional business information is also stored with said telephony information in the call log.

13 Claims, 9 Drawing Sheets

DAILY REPORT DATABASE

| CALLS WITHOUT ANI INFORMATION | | | | |
|---|---|---|---|---|
| APPLICATION | No. OF CALLS | ABANDONED | DELIVERED | DDI(%) |
| ORDER ENTRY | 10 | 2 | 8 | 20 |
| TELESALES | 30 | 10 | 20 | 35 |
| DEBIT COLLECTION | 140 | 30 | 110 | 45 |

FIG.3A

DAILY REPORT DATABASE

| CALLS WITH ANI HITS | | | |
|---|---|---|---|
| APPLICATION | No. OF CALLS WITH SINGLE HITS | No. OF CALLS WITH MULTIPLE HITS | No. OF ZERO HITS |
| ORDER ENTRY | 5 | 10 | 50 |
| TELESALES | 70 | 35 | 15 |
| DEBIT COLLECTION | 40 | 80 | 20 |

FIG.3B

| DEPARTMENT | TOTAL ORDER VALUE |
|---|---|
| ORDER ENTRY | 1,000,000 |
| TELESALES | 50,000 |
| DEBIT COLLECTION | 750,000 |

FIG.3C

DAILY REPORT DATABASE

| | TOTAL ORDER VALUE |
|---|---|
| 01962 816057 | £ 250,000 |
| 01962 816000 | £ 750,000 |

CALL LOG DATABASE

| UNIQUE CALL IDENTIFIER | ANI | No OF HITS IN CUSTOMER DATABASE | CUSTOMER HIT 1 | CUSTOMER HIT 2 | CUSTOMER HIT 3 | CUSTOMER HIT 4 |
|---|---|---|---|---|---|---|
| 1 2 3 4 | 01962 816000 | | | | | |

CALL LOG DATABASE

| UNIQUE CALL IDENTIFIER | ANI | No OF HITS IN CUSTOMER DATABASE | CUSTOMER HIT 1 | CUSTOMER HIT 2 | CUSTOMER HIT 3 | CUSTOMER HIT 4 |
|---|---|---|---|---|---|---|
| 1 2 3 4 | 01962 816000 | 3 | PHIL | KEVIN | CONOR | — |

CALL LOG DATABASE

| UNIQUE CALL IDENTIFICATION | ORDER VALUE |
|---|---|
| 1 2 3 4 | £ 10,000 |

TELEPHONE CALL CENTRE PERFORMANCE EVALUATION

FIELD OF INVENTION

This invention relates to the evaluation of telephony call centre performance. In particular it relates to an application that improves the ability of the call centre manager to evaluate the usage of resources in a call centre.

BACKGROUND OF INVENTION

A call centre can be defined as a place in a company or business that handles incoming and/or outgoing calls from/to its customers in support of its day-to-day operation. This can be a telemarketing area, where the employees make outgoing calls to try and sell the company's products. It can be a service area that receives incoming calls from its customers for repair or maintenance of the company's goods or services. A call centre will have a telephone system which may be as simple as a small single-line phone, increasing in complexity up to a large multi-node PABX. A call centre would normally have a computerized system for tracking, logging and recording call details, although some simply use paper forms. It may have one operator or agent, or it may have many, depending on the size of the company or business.

With caller demand for telephony call centre functions increasing, an important task for call centre managers is to optimize the use of their existing call centre to squeeze as much performance out of it as possible. One existing tool, described below, provides a useful aid to call centre managers. A known reporting tool for call centre managers monitors the call activity of agents in an Advanced Call Distribution (ACD) group and provides statistical information about any extension monitored by the telephony system. The data collected by the tool can be used to generate the sample reports included with the package, or to create customized reports. The reporting tool analyzes the event data and writes the data to a database. The data recorded by the tool includes the following: length of time the extension rang before being answered; length of time the customer waited in the ACD queue before reaching an agent; number of times the customer was placed on hold and the total amount of time spent on hold; length of time the agent was idle; number of times other agents were conferenced in the call; length of time the agent is handling an incoming call; length of time the agent is making an outgoing call and length of time the agent identification performing other work, such as entering wrap-up data.

The positive or negative quality of these factors affects customer satisfaction. Using the reporting tool to monitor these factors enables one to continuously modify call centre operations to meet and exceed customer demands. However, the reports generated only use the network information from the switch (PBX) to update a call log with telephony event times. As such the management information generated from this single source is of limited use. In this specification it is recognized that information from other sources needs to be combined with the telephony event information to produce useful reports for the efficient management of the system. In particular the availability of CLI/ANI (caller line identification/automatic number identification) information from the telephone network for certain applications may vary. If only a fraction of calls have ANI associated with them then the ability to automatically pop the customers account details when the agent answers the call is limited. This leads to longer call handling times and higher costs as the call centre has to employ a larger number of agents and incur higher network charges when the call centre is paying for the call. A remedy that the call centre manager may then consider is to introduce a VRU (voice response unit) which answers all the customer's calls and prompts the customer for their account numbers before transferring the call to an available agent. Furthermore the availability of the correct telephone numbers in the host database holding the customers records may vary. If the customer database on the host computer does not have the correct telephone number stored in it then it will not be possible to identify the customers account and pop the screen automatically. In this case there are several possible actions the call centre could take to improve the situation. It may be that the database needs 'cleaning', that is removing separator characters in the telephone numbers or taking account of a country s number plan characteristics, for instance, ensuring that all numbers start with '01' in the UK. It may be that the customer is calling in from a number of different phones and that database records need extending to hold more telephone number fields. Also by looking at business statistics associated with a call, for example, the revenue associated with a call or the business purpose of call, the call centre manager can acquire a unique insight into the call centre operation and allows him to modify his business processes to improve the call centre operation.

SUMMARY OF INVENTION

This specification proposes a monitor application that will collect the information from the various diverse sources and present it to the call centre manager in a way that will enable him to measure the performance of the CTI solution, identify any short comings, monitor the effect of any changes and forecast future trends.

In one aspect of the invention there is provided a method of monitoring the performance of a CTI enabled business application for a call centre comprising the steps of: acquiring telephony network information from the telephony network when a telephone call is made to the call centre; searching for information stored by the business application and associated with the telephony network information at the beginning of the call is made; and storing said business information with said telephony information such that the telephony information and existing business information are combined.

In another aspect of the invention there is provided a method of monitoring the performance of a CTI enabled business application for a call centre comprising the steps of: acquiring telephony network information from the telephony network when a telephone call is made to the call centre; searching for information associated with the call which is stored by the business application during the call; and storing said business information with said telephony information such that the telephony information and business information are combined. The monitor application has several sources of information: a database containing parameters that describe the call centre environment (configuration database); a database containing parameters that describe which reports are required and the format they are to be presented in (report parameter database); a customer database for each of the CTI applications (host application custom database); the telephony event information from the switch for all the CTI enabled agents in the call centre (call log database); the reports and historical data generated from previous runs of the monitor application (archive database). The monitor application will produce output that is generally graphical in nature as this will reveal patterns and trends. The output can either be displayed at a workstation 14 or in printed form. There will also be the ability to compare information with: the previous number of days; the same day of previous weeks; the same day in the same week of the previous months; and the weekly/monthly/yearly average.

The following list gives an example of the type of information presented.

Abandoned call statistics: the time the call was abandoned; the length of time the call was queued before the customer abandoned; if CLI/ANI information was associated with the call; the number of attempts any one customer made; the number of abandoned calls that were eventually answered; and the number of calls that overflowed between any two ACD group.

Intelligent Answering statistics: the percentage of calls that produced a single hit on the customer databases; a file containing information for those calls were CL/ANI information was available but a customer record was not found. This file can be used at a later date to correct the customer databases.

Transferred calls: transferring group and agent; disposition code for transferred calls; length that the customer was on hold; and duration of transferred call. Telephony statistics: average time to answer a call; worst case time to answer a call; average and worst case for the length of time the customer was on put on hold; and statistics on out of hours calls.

Business statistics: average revenue per call; revenue against length of call; and call disposition statistics.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
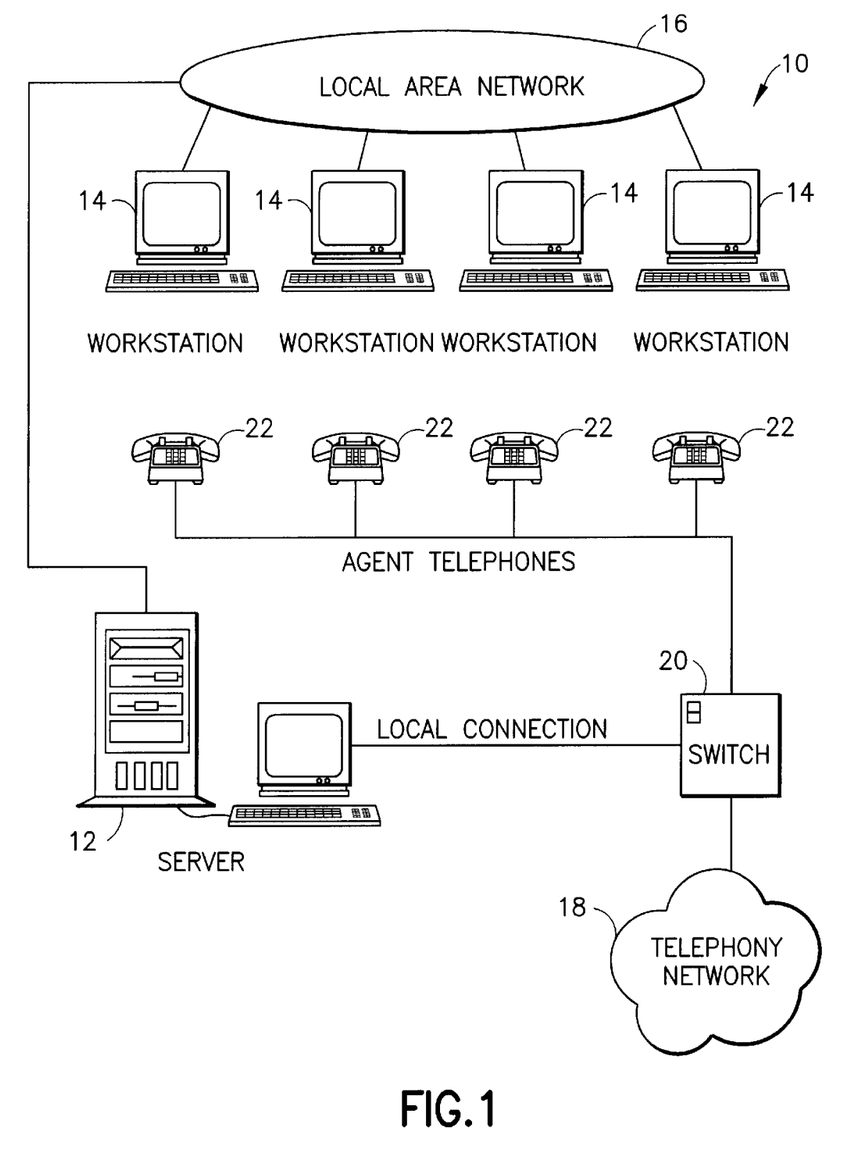
FIG. 1 is a schematic representation of a call centre of the embodiment.

Referring to FIG. 1 there is shown a typical call centre 10 or Automatic Call Distribution (ACD) arrangement. A PC based computer telephony server 12 is connected to a number of PC based computer clients or agent workstations 14 by a local area network (LAN) 16. The server 12 is connected to a public telephony network 18 through a switch 20 (PBX). Connected to the telephony network 18 through the switch 20 are agent telephones 22 corresponding to each of the workstations 14.

The switch 20 makes, breaks or changes the connections between telephone lines in order to establish, terminate, or change a telephone call path and is typically a private branch switch residing on the same premises as the server 12. The switch 20 would suitably be a Siemens Hicom* 300 but could be one of many suitable switches provided amongst others by Lucent, Nortel or Alcatel. The switch 20 provides network information to the telephony application such as ANI (answer number identification, also known as Caller Line Identification (CLI)) and DNI (dialled number identification). It also allows a telephony application 24 to perform intelligent dialling functions and to transfer calls.

The server 12 PC is typically a pentium based PC with 192 M bytes of memory, 25 G bytes of hard drive, keyboard, mouse, and VDU connected to the LAN 16 using an ethernet card. A suitable operating system 26 is OS/2 Warp but Microsoft's Windows NT* would also be suitable. On top of the operating system is: the telephony application 24 which controls the switch for the call centre 10, a monitor application 28 for providing reports about the call centre performance and an area of memory reserved for storing databases used by the telephony application 24, monitor application 28 and workstation applications (not shown).

Each workstation 14 is typically a Pentium microprocessor based PC with 32 M bytes of memory, 4 Gbytes of hard drive, keyboard, mouse and VDU connected to the LAN 16 using an Ethernet card. A suitable operating system is IBM's OS/2 Warp running the workstation application which communicates with the server 12. The workstation application sends and receives messages from the switch through the LAN 16 and telephony application using an application programming interface which is part of the telephony application.

Figure 2:
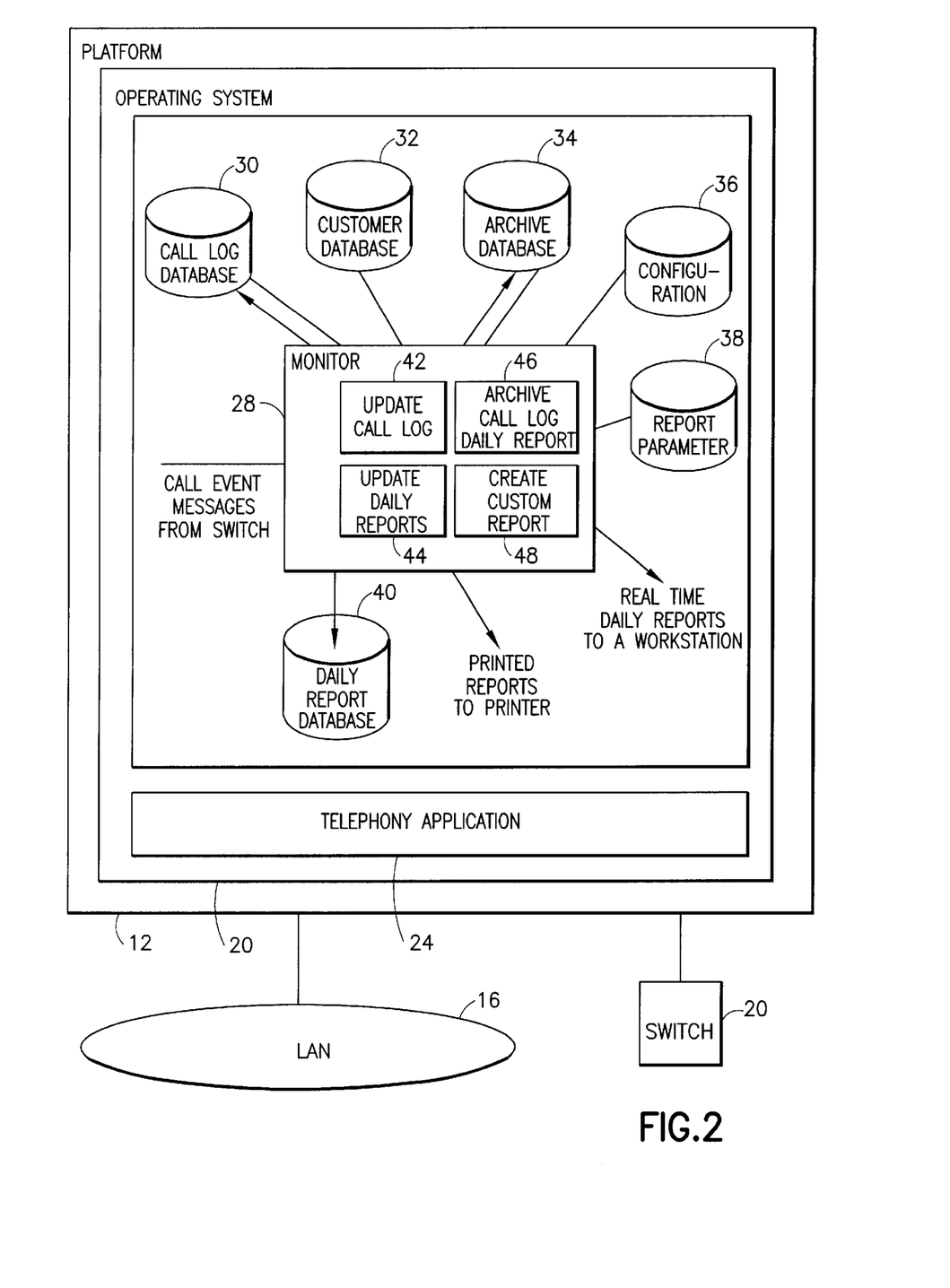
FIG. 2 is a more detailed representation of the platform on which the embodiment resides.

The databases stored in the server memory comprise: a call log database 30; a customer database 32; an archive database 34; a configuration database 36; a report parameter database 38 and a daily report database 40 (see FIG. 2).

The monitor application 28 comprises four main components: an update call log component 42; an update daily report component 44; an archive daily report component 46; and a create custom report component 48 (see FIG. 2).

The update call log component 42 performs the function of updating the call log 30 with information from the network received in the form of telephony event messages from the switch 20. The update call log component 42 also updates the call log 30 with existing business information (such as the name of the customer making the call) located in the customer database 32. The update call log component 42 further updates the call log data base 30 with business information derived from the call by the agent such as the order value. Process steps performed by the update call log component 42 are shown by steps 100, 101, 102, 103, 105, 107, 108, 110, 114 and 115 in FIG. 9.

Figure 3A:
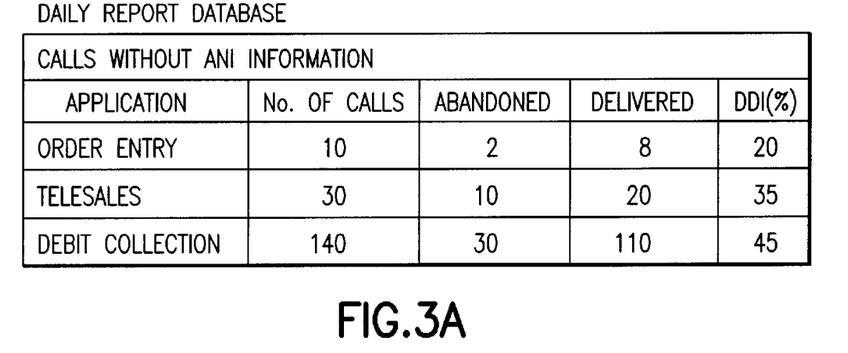
FIGS. 3A to 3D show examples of reports generated for a daily report database.

The update daily report component 44 creates a real time report based on the current call log, existing business information and derived business information from the customer database. Report templates are retrieved from the report parameter database and information is retrieved directly from the call log database and indirectly from the customer database 32 using directory paths for the relevant business information found in the configuration database. After each call the reports are updated. Examples of daily reports are shown in FIGS. 3A to 3D. FIG. 3A shows calls that have no ANI arranged by department and split into abandoned and delivered calls and also the percentage of DNIS calls (dialled number identification service—eg. those calls which dial directly into the department concerned). In this example the number of calls for debit collection department is much higher than the other departments and a higher percentage of the calls are direct dialled calls. Faced with such an example a call centre manager might decide that adding a voice response unit (VRU) to handle direct dialled calls to the debit collection department would be appropriate.

Figure 3B:
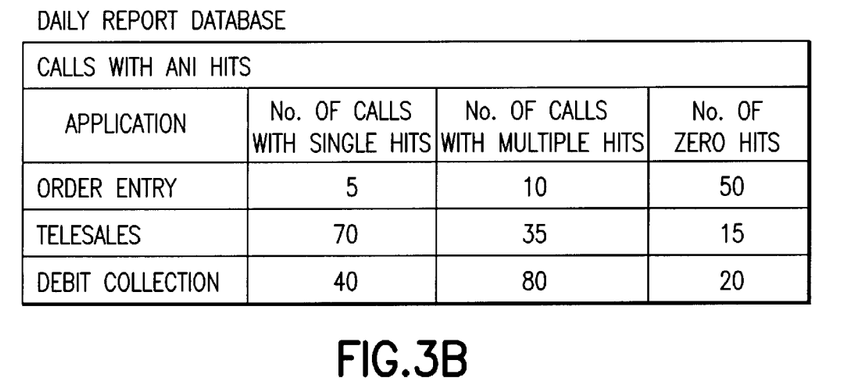
Figure 3C:
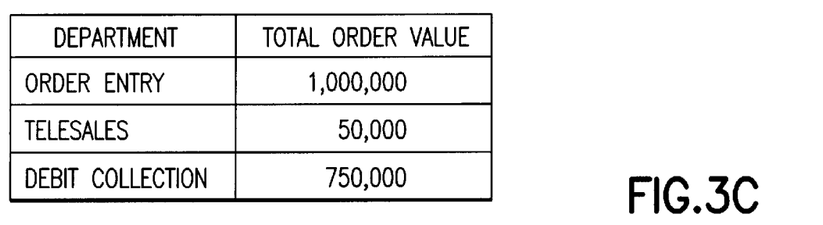
Figure 3D:
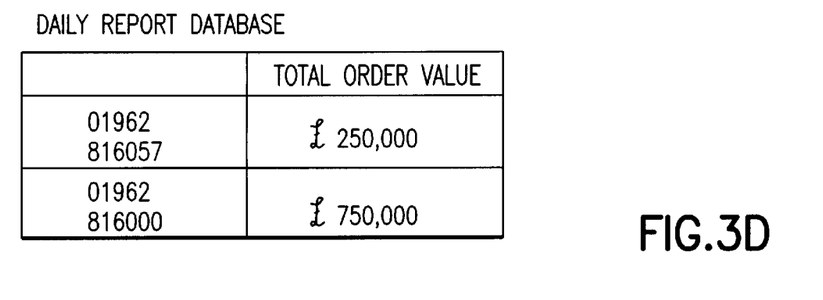

FIG. 3B shows the calls that have ANI and the results of the search made on the customer database using that ANI. In this example the order entry department has a large number of zero hits compared with the other departments. This could indicate to the call centre manager that the telephone numbers have been entered incorrectly in the customer database and a check should be centred on order entry customers within the customer database. The debit collection department has a large number of customers with multiple hits and this should indicate that a VRU might be appropriate. FIG. 3C gives the running total order value by department and FIG. 3D gives the running total order value by customer telephone number (ANI) (shown in FIG. 3D) or by customer name (not shown).

Figure 4:
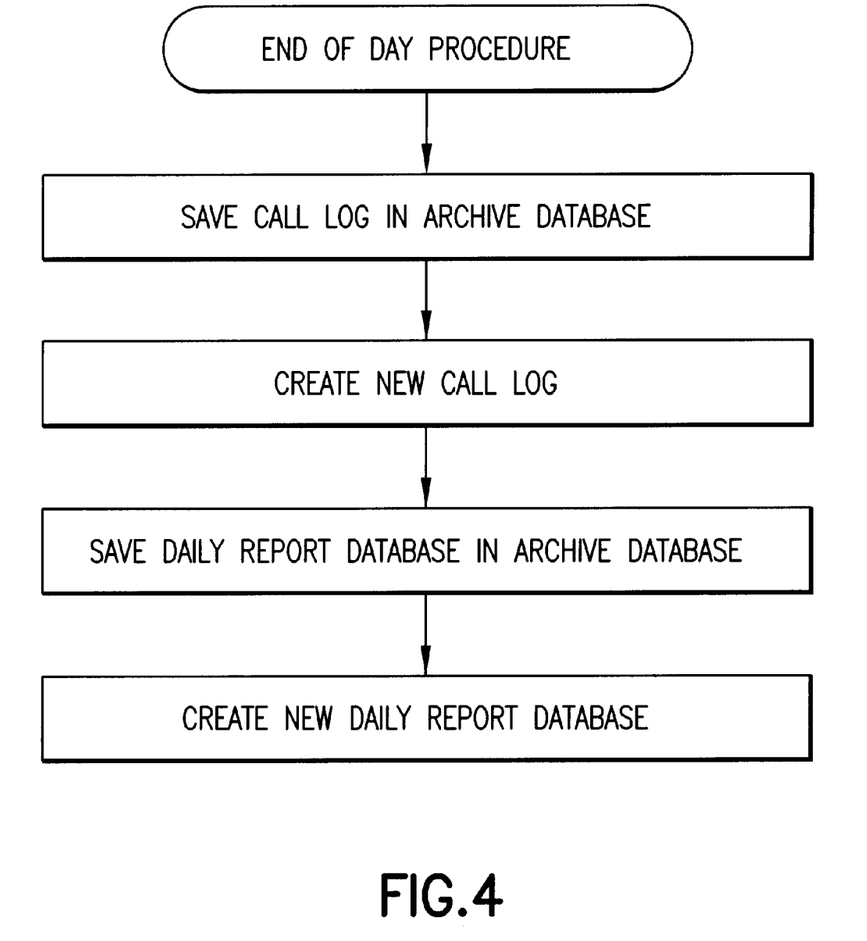
FIG. 4 is a flow diagram showing an end of day procedure of the monitor program.
Figure 5A:
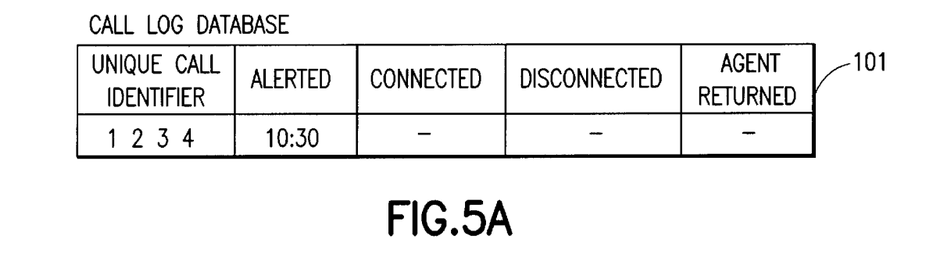
FIGS. 5A to 5D show the changes to a call log database during operation of the monitor application.
Figure 5B:
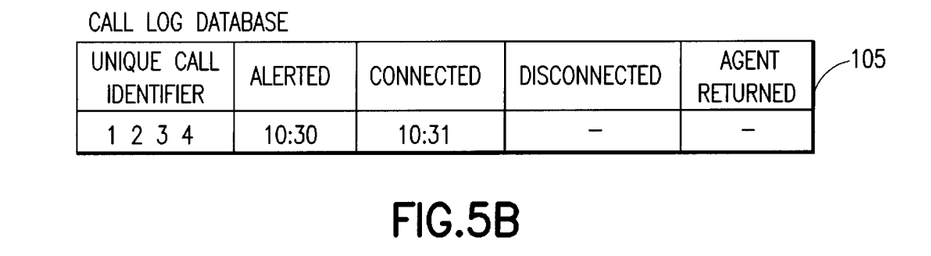
Figure 5C:
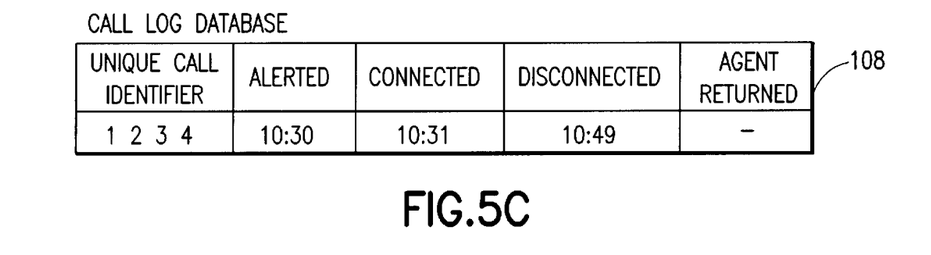
Figure 5D:
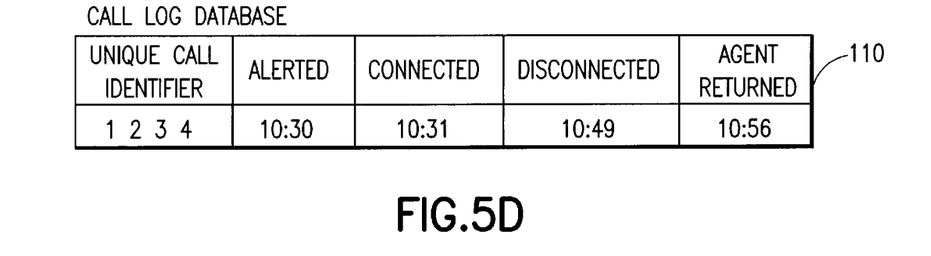
Figure 6A:
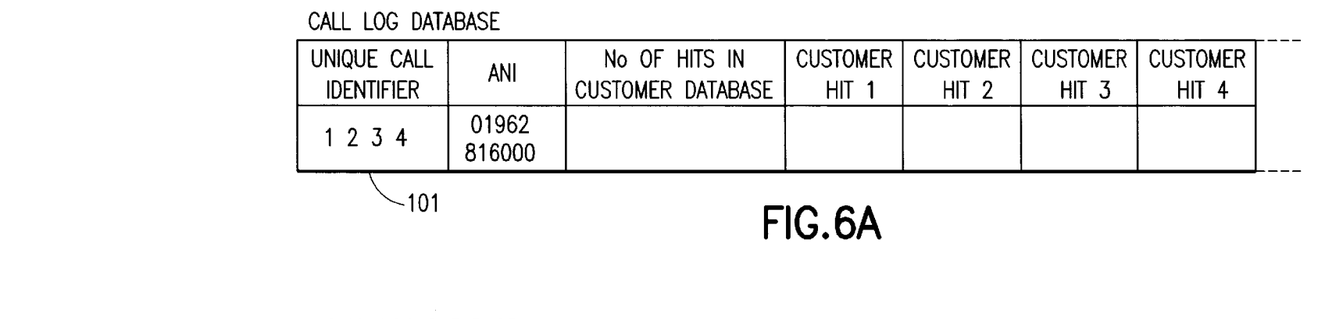
FIGS. 6A to 6C show the changes to the call log database during further operation of the monitor application.
Figure 6B:
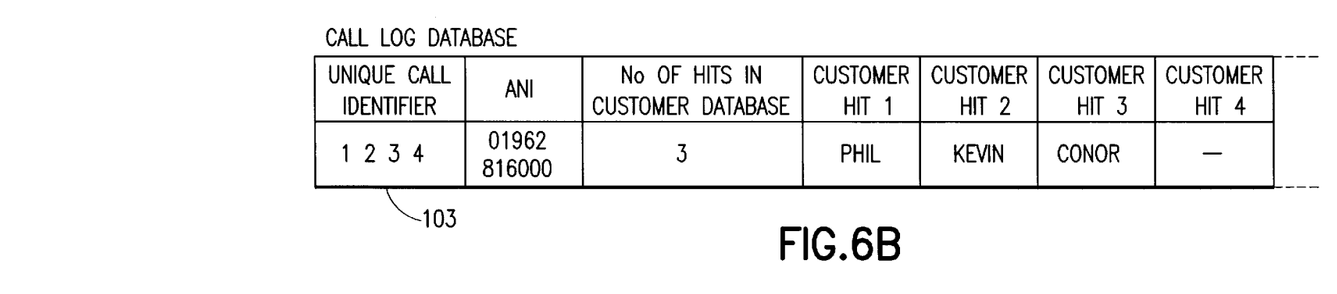
Figure 6C:
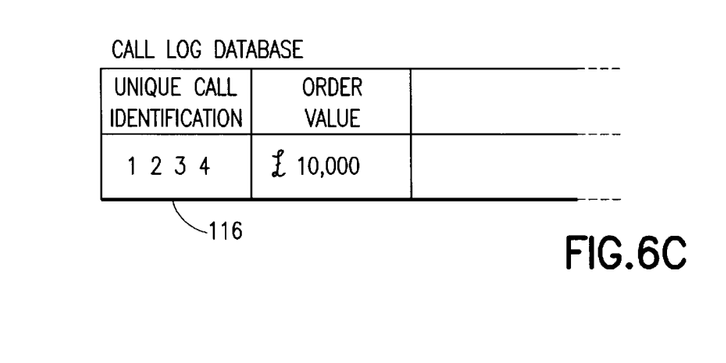

The archive component 46 operates at the end of the day to save the call log data and the daily report data in the Archive database 34. Each of these data bases is started afresh the next day. The steps involved in this process are shown in FIG. 4. First the archive component 46 saves the call log database 30 in the archive database 34. Next a new call log data base is created while the old one is deleted. Next the daily report database 40 is saved in the archive database 34. Next the old daily report database is deleted and a new one created.

The create custom report component 48 generates reports from the templates stored on the report parameter database 38 to access information stored on the archive database 34.

The call log database 30 keeps a record of all the calls that pass through the call centre 10. The call log database 30 is owned by the monitor application, that is the monitor application can make direct calls to the call log database without going through the configuration database because the monitor application defines the call log database. It contains one record for each call. Examples of records in the call log database are shown in FIGS. 5A to 5D and FIGS. 6A to 6C. A call log record holds telephony data and business data. The telephony data is derived from the call event messages sent by the switch. These event messages provide detailed information about each agents call, for example when the phone starts ringing, when it is connected and when it is disconnected. The business data comprises two different types: that retrieved from the customer databases using the CLI/ANI information associated with the call at the time the call is connected (existing business data); and that derived from the call at the time the call is disconnected (derived business data). This database will also record the details of abandoned calls. Fields in the call log database 30 that may be used by the monitor application 28 are: a unique call identifier for each call; the time the agent's phone is alerted; the time the agent's phone is connected; the time the agent's phone is disconnected; the time the agent returns from the application; the agent's directory number; the agent's ID; the directory number of the other party involved in the call; the dialled number; the original ACD group number; the ACD group number; the call type; whether the call is inbound/outbound; held duration; the directory number of the telephone the call was forwarded from; the forward reason if any; the number of enquiries the agent made during the call; the number of extend attempts; the extended to directory number; business information associated with this call (the figures show a simplified version of the call log database).

The customer database 32 is associated with the business application that the agent uses during the conversation with the customer. It is used by the monitor application 28 and by other business applications on the server 12 and on the workstations 14. A business application typically has one customer database but where the call centre 10 has multiple departments with specialist applications there may be more than one customer database 32. The structure and the fields in the customer database are application specific. In the example of the embodiment a sales ordering application is running on the server 12 and accesses the customer database to place an order. A screen pop (see FIG. 7) is displayed on a workstation VDU by the sales ordering business application so that the agent can enter the order details taken from the customer over the telephone. The sales ordering application has a customer record 50 for each customer including a customer name field 52; a ANI identification field 54; and an address field 56. For each customer record 50 there are many order records 58, linked to the customer record 50 by the customer name 52 and having an order number field 60, a call number field 62 for the call number of that order, an agent field 64 for the agent who took the call, and a total value field 66 for the total value of the order.

Figure 7:
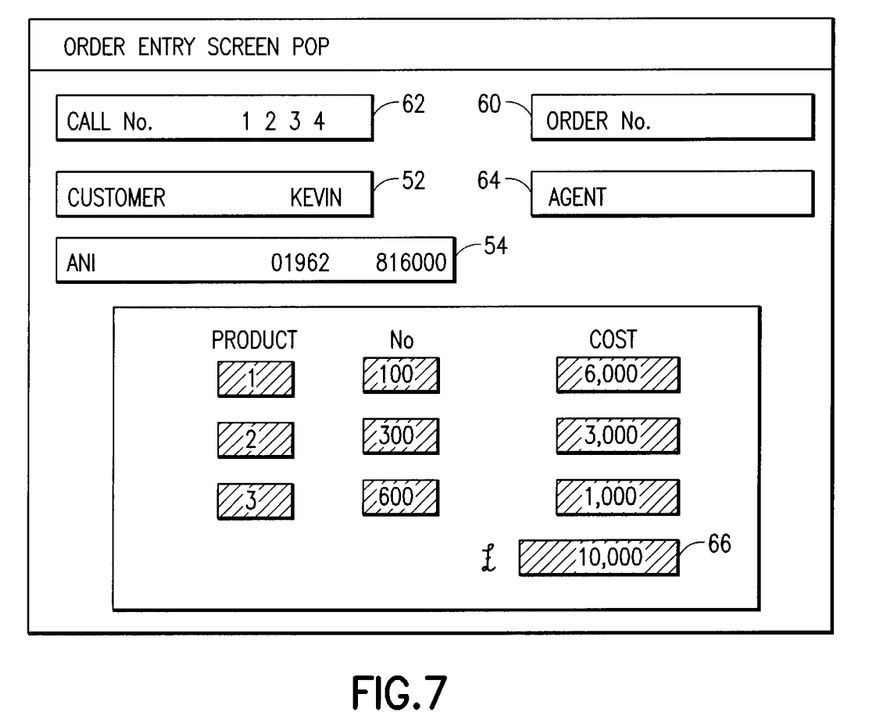
FIG. 7 is a screen pop for making an order entry in a customer database.

FIG. 7 shows the order entry screen pop with data entry field for agent input. This screen is part of the business application and appears once a hit is made on the customer database with an ANI number or the customer identified another way. The call number field 62 is the unique number assigned to the call by the telephony application when it first raises an event. The order number 60 is a unique number given by the order entry application when the order is raised. The customer name 52 is the name of the customer found using the ANI number—this is existing business information. The order information including the total value of the order 66 is entered by the agent into the boxes shaded in FIG. 7—this information is derived business information.

Figure 8:
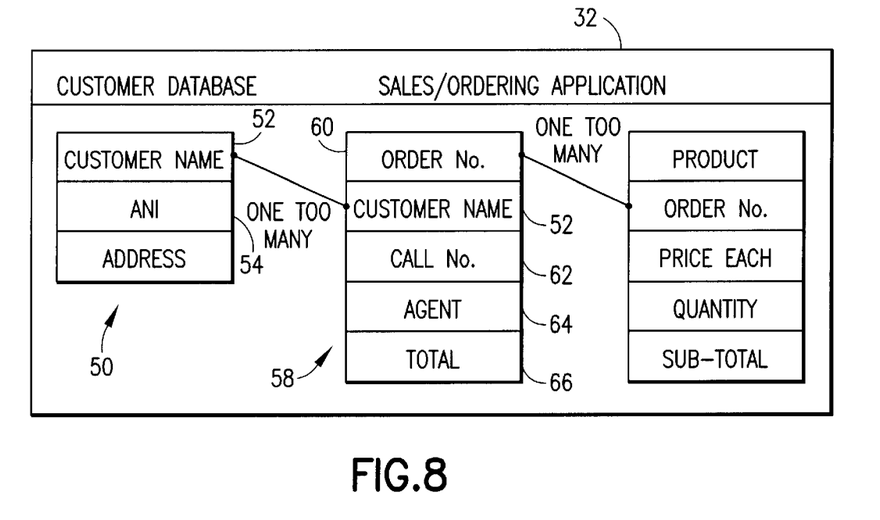
FIG. 8 shows the structure of data within the customer database of the embodiment.

FIG. 8 shows the relationship between the customer records 50, the order records 58 and product records 68 in the embodiment. In this example, for each order, there is a record 68 for each product ordered including fields for the order number, the product name, the quantity required, the price of each and the sub-total (see FIG. 8). This is only an example of a customer database and many alternative structures, fields and applications may be used. The fields used by the monitoring application 28 in this embodiment are: customer name 52; customer telephone number i.e. ANI identification number 54; order number 60; total value of order 58. Each entry in the customer database has an index number so that the monitor program can access the entry by way of the index number to retrieve the derived business information. In this embodiment the unique call number 62 is an appropriate index number to use.

The archive database 34 is the database that is used to hold the data required to generate the reports and it stores the data from the call log 30 and the daily report 40 on a daily basis. Reports which may be generated from the data held in the archive database 34 include: total number of calls; number of calls with CLI/ANI information; number of calls with CLI/ANI that produced a single hit on the database; number of calls with CLI/ANI that had multiple hits on the customer database; the number of abandoned calls; the number of multiple abandoned calls; the dialled number of all abandoned calls; the average wait time; the longest wait time; the number of abandoned calls with CLI/ANI information; the number of calls that were transferred after being answered by an agent; the disposition or completion code for all transferred calls; the duration of each transferred call; the dialled number of all transferred calls. For the entire call centre 10 reports can include: the number of answered calls; the average time to answer a call; the longest time to answer a call; the number of calls where the customer was put on hold; the longest time a customer was put on hold; the disposition or completion code of all held calls; the average call duration; the longest call duration; the number of calls per disposition or completion calls; and the average revenue associated with each call. For each agent, reports can include: the number of answered calls; the average time to answer a call; the longest time to answer a call; the number of calls where the customer was put on hold; the longest time a customer was put on hold; the disposition or completion code of all held calls; the average call duration; the longest call duration; the number of calls per disposition or completion calls; and the average revenue associated with each call.

The configuration database 36 holds detailed information about the call centre's environment. The monitor application 28 uses it to identify the business application databases and the fields within these databases that it requires to build the reports. For instance; the name of the application; the path and name of the application database; the name of the field that holds the unique account identifier, i.e. the account number; the name of the field that holds the customers telephone number; and the names of the fields that hold relevant business information.

The report parameter database 38 enables the monitor application to produce different reports by storing the specification of these reports.

The daily report database 40 holds the statistics for the day and is updated on a continuous basis. For instance, the abandoned, routed calls ratio on a department basis; the calls with zero, single and multiple hits from the customer database on a department basis; the total order value of calls from a particular department; and the total order value of particular customers.

Figure 9:
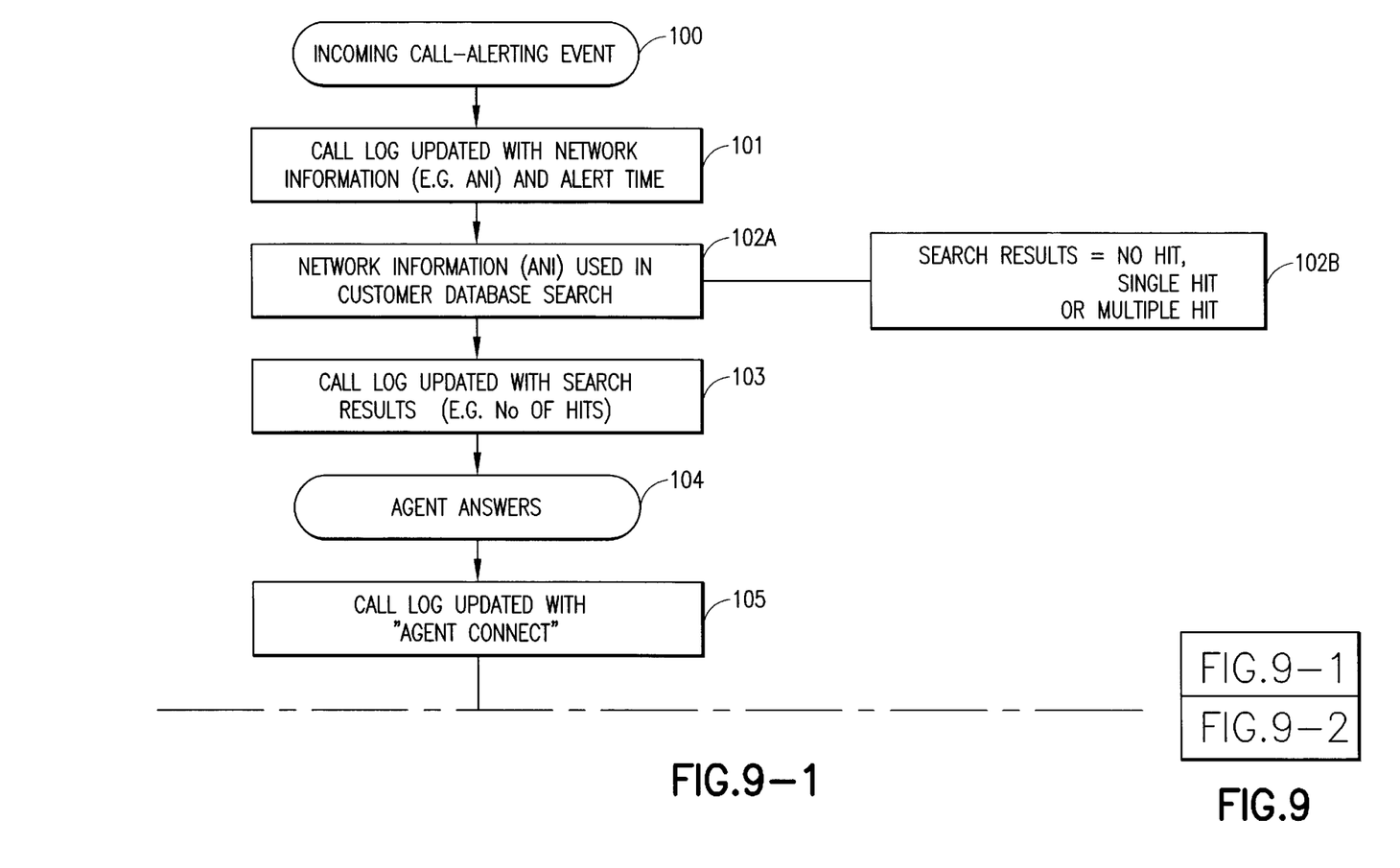
FIG. 9 is a flow diagram of a process flow of a monitor application of the embodiment.

Referring to FIG. 9 there is shown typical steps in the process performed by the monitor application. In this example an incoming call comes in from a customer who wishes to place an order, a screen pop (FIG. 7) appears with the customer s details and allows the agent to enter the order details. In the process the call log 30, daily report database 40 and the customer database 32 are updated with the appropriate information. In step 100 the incoming call causes an alerting event in the form of a message including network information such as ANI or DNIS information to be passed to the monitor application. In step 101 the monitor application updates the call log database with the network information and the time when the monitor is alerted to the call by the alerting event (see FIG. 5A). In step 102A the network information is used to search the customer database and the search results are passed back in step 102B. The calls can be categorised: no ANI is where the network information is not supplied; no hit is where the search has found no matching entries in the customer database using the ANI number; single hit is where the search has found just one customer who matches the ANI number; and multiple hits is where the search finds more than one hit on the ANI number. In the case of single hit the monitor application can use the customer hit directly. No hit indicates a new customer or an existing one using a different phone and further enquiry must be made to find whether a new entry or an existing one is needed.

Multiple hits indicate that further enquiry must be made to find out which entry is correct. Step 103 uses the ANI information to update the call log with the existing business information (for instance the customer name and the number of hits on the database). In step 104 the agent answers the phone. In step 105 the call log 30 is updated with the time that the agent connects (see FIG. 5B). In step 106 the agent uses a screen pop such as in FIG. 7 to enter the order details of the customer into the customer database. Once this is complete the call can end—step 107 and the call log is updated with the disconnect time—step 108 and FIG. 5C. At this time the agent may need to finish updating the order entry and will return from the business application some time after the call has disconnected step 109—after returning from the application the call log is updated with the agent return time—step 110 and FIG. 5D. In step 111 the monitor application retrieves template information from the report parameter database and step 112 retrieves the business information using the index number (call number 62) from the last entry made in the customer database to update the daily report database in step 113. The monitor application accesses the external customer database by using directory path details found in the configuration database and finds the correct entry by way of the index number of the entry. Once the daily report database has been updated with the derived business information then in step 114 the customer database is accessed again for derived business information but this time to update the call log—step 115. The monitor application updates the call log database with the network information step 101 and FIG. 6A, with the existing business information step 103 and FIG. 6B and with the derived business information step 116 and FIG. 6C.

In summary there is described a method of monitoring the performance of a CTI enabled business application for a call centre is described. The method comprises the steps of acquiring telephony network information such as an Automatic Number Identification from the telephony network when a telephone call is made to the call centre and searching for information stored by the business application such as the customer name which is associated with the ANI from the telephony network. This search is made at the beginning of the call and the customer name is stored with ANI in a call log. Additional information associated with the call such as an order taken during the call is searched for after the call is completed and this additional business information is also stored with said telephony information in the call log.

"Windows NT is a trademark of Microsoft Corporation" and Hicom is a trademark of Siemens.

Now that the invention has been described by way of a preferred embodiment, various modifications and improvements will occur to those person skilled in the art. Therefore it should be understood that the preferred embodiment has been provided as an example and not as a limitation.

In summary there is described a method of monitoring the performance of a CTI enabled business application for a call centre is described. The method comprises the steps of acquiring telephony network information such as an Automatic Number Identification from the telephony network when a telephone call is made to the call centre and searching for information stored by the business application such as the customer name which is associated with the ANI from the telephony network. This search is made at the beginning of the call and the customer name is stored with ANI in a call log. Additional information associated with the call such as an order taken during the call is searched for after the call is completed and this additional business information is also stored with said telephony information in the call log.

What is claimed is:

1. A method for a monitor business application of automatically creating a record of the performance of business applications at a computer telephony integrated (CTI) call centre for use in monitoring the performance of said call centre, said call centre being connected to a telephony network and including a customer record database storing customer records, a daily report database, a daily archive database, a report parameter database, a custom report call log storing call records, and at least one business information database comprising business information and call centre performance information stored by said business application and associated with said plurality of call records and customer records, said method comprising the steps of:

automatically acquiring call identification information from the telephony network for a telephone call made by the customer to the call centre;

automatically updating the daily report database and said daily archive database with said call identification information;

automatically searching with said call identification information the customer record database and said business information database for all stored records and call centre performance information associated with the call identification information;

automatically creating a custom call record associated with the call in the custom report call log in accordance with parameters specified in said report parameter database;

automatically storing the acquired call identification information and the number of records found during the searching step in the created custom call record; and repeating the acquiring, updating, searching, creating and storing steps for each new call;

whereby, for a plurality of calls, the call records in the call log will represent a performance history of the call centre for that plurality of calls.

2. A method as claimed in claim 1 further comprising storing an identifier in the call log, said identifier associated with a telephony application processing the call.

3. A method as claimed in claim 1 further comprising presenting a view on the call log whereby the call records are grouped by telephony application identifier.

4. A method as claimed in claim 3 wherein a customer database hit report is produced from the call log and updated with every new call.

5. A method as claimed in claim 3 wherein the caller identification information and the number of located customer records are archived regularly.

6. A method as claimed in claim 5 wherein a report is produced from the archived caller identification information and the number of located customer records.

7. A system of creating a record of the performance of a computer telephony integrated (CTI) call centre for use in automatically monitoring the performance of said call centre, said call centre being connected to a telephony network comprising:

a customer record database storing customer records;

a custom report call log storing call records;

at least one business information database comprising business information and call centre performance information stored by said business application and associated with said plurality of call records and customer records;

a daily report database;

a daily archive database;

a report parameter database;

an acquisition component for automatically acquiring call identification information from the telephony network for a telephone call made by the customer to the call centre;

search component for automatically searching with said call identification information the customer record database and said business information database for all stored records and call centre performance information associated with the call identification information;

record component for automatically creating a custom call record associated with the call in the call log in accordance with the parameters specified in the report parameter database and for updating the daily report database and daily archive database with the call identification information;

storage for storing the acquired call identification information and the number of records found during the searching step in the created call record of the custom report call log; and processing means for initiating the acquiring, searching, updating, creating and storing steps for each new call;

whereby, for a plurality of calls, the call records in the call log will represent a performance history of the call centre for that plurality of calls.

8. A system as claimed in claim 7 further comprising means for storing an identifier in the call log, said identifier associated with a telephony application processing the call.

9. A system as claimed in claim 8 further comprising a component for presenting a view on the call log whereby the call records are grouped by telephony application identifier.

10. A system as claimed in claim 9 further comprising a reporting component for producing a report from the call log and updating the report with every new call.

11. A system as claimed in claim 10 further comprising an archiving component for regularly archiving the call log.

12. A system as claimed in claim 11 further comprising a report component for producing a report from the archived call log.

13. A computer program product readable by machine tangibly embodying a program of instructions executable by the machine for performing a method for a monitor business application of automatically creating a record of the performance of business applications at a computer telephony integrated (CTI) call centre for use in monitoring the performance of said call centre, said call centre being connected to a telephony network and including a customer record database storing customer records, a daily report database, a daily archive database, a report parameter database, a custom report call log storing call records, and at least one business information database comprising business information and call centre performance information stored by said business application and associated with said plurality of call records and customer records; said method comprising the steps of:

automatically acquiring call identification information from the telephony network for a telephone call made by the customer to the call centre;

automatically updating the daily report database and said daily archive database with said call identification information;

automatically searching with said call identification information the customer record database and said business information database for all stored records and call centre performance information associated with the call identification information;

automatically creating a custom call record associated with the call in the custom report call log in accordance with parameters specified in said report parameter database;

automatically storing the acquired call identification information and the number of records found during the searching step in the created custom call record; and repeating the acquiring, updating, searching, creating and storing steps for each new call;

whereby, for a plurality of calls, the call records in the call log will represent a performance history of the call centre for that plurality of calls.

* * * * *